(12) United States Patent
Rydneil et al.

(10) Patent No.: US 8,958,787 B2
(45) Date of Patent: Feb. 17, 2015

(54) CLOSING MULTIPLE NETWORK CONNECTIONS FOR A USER EQUIPMENT USING ONE MESSAGE EXCHANGE

(75) Inventors: Gunnar Rydneil, Västra Frölunda (SE); Zu Qiang, Kirkland (CA); Samy Touati, Rosemere (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 637 days.

(21) Appl. No.: 13/140,963

(22) PCT Filed: Dec. 19, 2008

(86) PCT No.: PCT/EP2008/068060
§ 371 (c)(1),
(2), (4) Date: Jun. 20, 2011

(87) PCT Pub. No.: WO2010/069403
PCT Pub. Date: Jun. 24, 2010

(65) Prior Publication Data
US 2011/0256856 A1    Oct. 20, 2011

(51) Int. Cl.
*H04M 3/00* (2006.01)
*H04M 1/66* (2006.01)
*H04W 4/00* (2009.01)
*H04W 76/06* (2009.01)
*H04W 60/06* (2009.01)

(52) U.S. Cl.
CPC ........... *H04W 76/064* (2013.01); *H04W 60/06* (2013.01)
USPC ........... 455/420; 455/410; 455/419; 455/434

(58) Field of Classification Search
USPC .............. 455/410–411, 418–420, 422.1, 455/423–425, 517, 550.1, 432.1, 433–434, 455/435.1, 466, 556.2, 560–561; 709/203, 709/218, 224–225, 227–229
See application file for complete search history.

(56) References Cited

U.S. PATENT DOCUMENTS

| 8,031,677 B1 * | 10/2011 | Wu et al. ............ 370/331 |
| 2009/0245177 A1 * | 10/2009 | Zhao et al. ............ 370/328 |
| 2009/0262736 A1 * | 10/2009 | Zhao et al. ............ 370/389 |

FOREIGN PATENT DOCUMENTS

| EP | 1724965 A | 11/2006 |
| WO | WO 03/086002 A | 10/2003 |

OTHER PUBLICATIONS

3GPP. 3rd Generation Partnership Project; Technical Specification Group Core Network and Terminals; Proxy Mobile IPv6 (PMIPv6) Based Mobility and Tunnelling Protocols; Stage 3 (Release 11). 3GPP TS 29.275 v11.4.0 (Sep. 2012).

(Continued)

*Primary Examiner* — Meless Zewdu

(57) ABSTRACT

The present invention relates to a method for closing all network connections to a detached user equipment. The local mobility anchor (LMA) receives and reads a control message saying that the user equipment is detached and all the network connections must be closed. The LMA performs the instructions in the control message, i.e. closes all the network connections to the user equipment. After the instructions have been executed, the LMA sends an acknowledgement back to indicate which actions have been performed. Thus, the closing of all network connections is done using only one message exchange and thereby saving signalling in the Core Network.

8 Claims, 6 Drawing Sheets

(56) References Cited

OTHER PUBLICATIONS

3GPP. 3$^{rd}$ Generation Partnership Project; Technical Specification Group Services and System Aspects; Architecture Enhancements for on-3GPP Accesses (Release 11). 3GPP TS 23.402 v 11.5.0 (Dec. 2012).

Gundavelli, S. et al. Proxy Mobile IPv6; draft-ietf-netlmm-proxymip6-18.txt. IETF NETLMM WG. May 30, 2008.

Muhanna, A et al. Binding Revocation for IPv6 Mobility; draft-ietf-mext-binding-revocation-01.txt. Network Working Group. IETF. Aug. 28, 2008.

* cited by examiner

CLOSING MULTIPLE NETWORK CONNECTIONS FOR A USER EQUIPMENT USING ONE MESSAGE EXCHANGE

TECHNICAL FIELD

The present invention relates to connections in Public Data Networks (PDN), in particular to close multiple connections for one user equipment by using only one message exchange.

BACKGROUND

Long Term Evolution/Evolved Packet Core (LTE/EPC) is standardized in 3GPP Release 8. The system includes 3GPP as well as non-3GPP system access. In a core network the Proxy Mobile IP (PMIP) protocol can be used as mobility protocol. When PMIP is used, basic IP connectivity is provided in the core network between the Packet Data Network Gateway (PGW) and the User Equipment (UE), e.g. a mobile phone. Compared to GPRS Tunneling Protocol (GTP) mobility protocol, the PMIP protocol provides simpler and limited functionality. In particular the bearer handling is simplified.

The system architecture of an existing solution is shown in FIG. 1, where a user equipment 3 is connected to a Evolved Universal Terrestrial Radio Access Network (EUTRAN). The system has a Mobility Management Entity (MME) providing control-plane functionality and giving orders to the Signaling Gateway (SGW). A Home Subscriber Server (HSS) is connected to the MME and describes the many database functions in the network. The Packet Data Network Gateway (PGW) 13 provides connectivity between the user equipment 3 and external networks. The Policy and Charging Rules Function (PCRF) 6 is connected between the PGW 13 and an operator's IP services 8, such as IMS, PSS etc. and takes care of policy and charging issues between the user equipment 3 and the operator. In the existing solution the core network (CN) interfaces S5/S8 can be PMIP or GTP based. The S2 interfaces are PMIP based. The PMIP based interfaces are marked with dashed lines in FIG. 1. The serving gateway (SGW) 12 or the non-3GPP access system 7 acts as an (Mobile Access Gateway) MAG, while the PGW 13 act as the local mobile anchor (LMA) using PMIP terminology.

When the user equipment first attaches the system (i.e. connects to the cellular network) it includes parameters to indicate relevant connection information, e.g. the Access Point Name (APN). The APN indicates to which external network (public data network, PDN) the user equipment wants to connect and it can be used in the network to select the proper PGW to handle the user equipment. The PGW can provide connectivity to several external networks and the APN is used also inside the PGW to connect to the correct external network.

When the user equipment has several connections activated and is detached, all its public data network connections need to be deleted or closed. Currently there exist several methods to close such network connections. Public data network connections can be closed individually for each user equipment or as a bulk closing for an entire network node. As of today, the MAG needs to send one Proxy Binding Update (PBU) message per public data network connection per user equipment, which implies several messages. When the user equipment has multiple public data network connections to different or to the same APN, a number of PBU/PBA (Proxy Binding Acknowledgement) must be sent from the MAG to the LMA. Thus, signaling bandwidth is wasted.

When public data network connections are removed on a PMIP interface there exist different procedures. One procedure is that the LMA may send a Binding Revocation Indication (BRI) message to the MAG, hosting a specific proxy mobile IPv6 session. The BRI message has the appropriate value in the revocation trigger field to indicate that the mobile node binding has been terminated and the MAG can clean up the applicable resources. In a second possible procedure the LMA sends a BRI message to indicate that all bindings which are hosted by the peer MAG and registered with the LMA are being revoked. For this second procedure, the BRI can only be sent in the direction from the LMA to the MAG. In a third possible procedure, the MAG sends a BRI message with the G bit set to indicate that all mobility sessions which are registered at the LMA and attached to the MAG are being revoked. For the third procedure which is in the direction from the MAG to the LMA, the BRI message with G bit set cannot be used to revoke all sessions related to a user equipment. It only can be used to revoke all sessions related to the MAG. A drawback with the BRI message for second and third procedure is that when the G bit is set by the sending mobility node, LMA or MAG, it requests the termination of all Per-Peer mobility Bindings or Multiple Bindings which share a common identifier that are served by the sending and receiving mobility entities. And in another procedure the MAG sends a PBU for one public data network connection at the time with the "TimeToLive" value=zero. Then the connection is removed in the LMA. A drawback for this last procedure is that the PBU (with lifetime=0) can only remove one session.

SUMMARY

The objective of this invention is to solve at least one of the above mentioned problems with the prior art, and to provide a mechanism that allows the PMIP network to more efficiently detach a user equipment and to delete multiple public data network connections or a user equipment using only one message exchange.

In order to meet the objectives set forth above there is in one aspect of the invention provided a method for closing multiple network connections to at least one user equipment when the at least one user equipment is detached. The method comprises the following steps:
  receiving a control message in a local mobility anchor, LMA, node, the control message comprising instructions to close the multiple network connections,
  reading the control message in the LMA,
  closing the multiple network connections to the user equipment,
  sending an acknowledgement to an external node.

In an alternative embodiment of the present invention the control message comprises an information element indicating that the message is valid for one user equipment and all its network connections.

In yet an alternative embodiment of the present invention the information element is a 3GPP vendor specific option, VSO, information element.

In still an alternative embodiment of the invention the VSO comprises the instruction "Delete all connections for the user equipment".

In still yet an alternative embodiment of the present invention the control message is a proxy binding update, PBU.

In an alternative embodiment of the present invention the acknowledgement is a proxy binding acknowledgement, PBA, comprising one of the following: a verification that all network connections are closed or a list of network connections not closed.

In a second aspect of the invention there is provided a method for closing multiple network connections to at least one user equipment. The method comprises the following steps:
- detecting a detached user equipment
- deciding to close the user equipment's network connections,
- sending a control message to a local mobility anchor, LMA, the control message comprising instructions to close the multiple network connections,
- receiving an acknowledgement from the LMA.

In an alternative embodiment of the second aspect of the present invention a mobile access gateway, MGA, or a Policy and Charging Rules Function, PCRF, detects the detached user equipment, decides to close the connections, sends the control message and receives the acknowledgement.

In yet an alternative embodiment of the present invention the acknowledgement is a proxy binding acknowledgement, PBA, comprising one of the following: a verification that all network connections are closed or a list of network connections not closed.

In still an alternative embodiment of the invention the list of network connections not closed triggers a troubleshooting function.

In a third aspect of the present invention there is provided a communication node in a telecommunications network arranged to close multiple network connections associated with at least one user equipment when the at least one user equipment is detached. Said node comprising a processor arranged to execute instruction sets stored in a memory. The processor is arranged to receive a control message through a communication interface, read the message, close the multiple network connections to the user equipment and to send an acknowledgement to and external node.

In a fourth aspect of the present invention there is provided a system comprising a first node and second node. The first node is arranged to be connected to the second node via multiple network connections, and the first node comprises a MAG or a PCRF and the second node comprises a LMA. The first node is arranged to send a control message to the second node, the control message comprising instructions to close the multiple network connections. The second node is arranged to receive and read the control message, to close the multiple network connections and to send an acknowledgement to the first node.

The objects of this invention are obtained as described in the accompanying claims.

BRIEF DESCRIPTION OF THE DRAWINGS

The invention will now be further described in more detail in the following detailed description by reference to the appended drawings in which.

DETAILED DESCRIPTION

Figure 1:
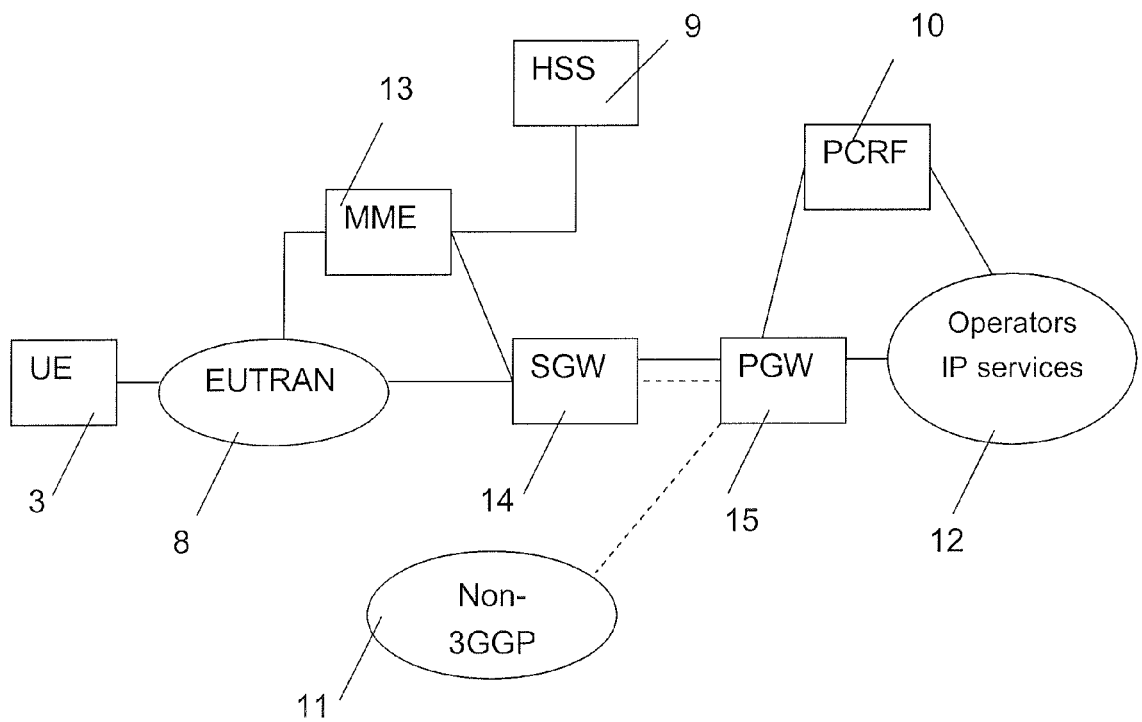
FIG. 1 illustrates an example of an existing system.
Figure 2:
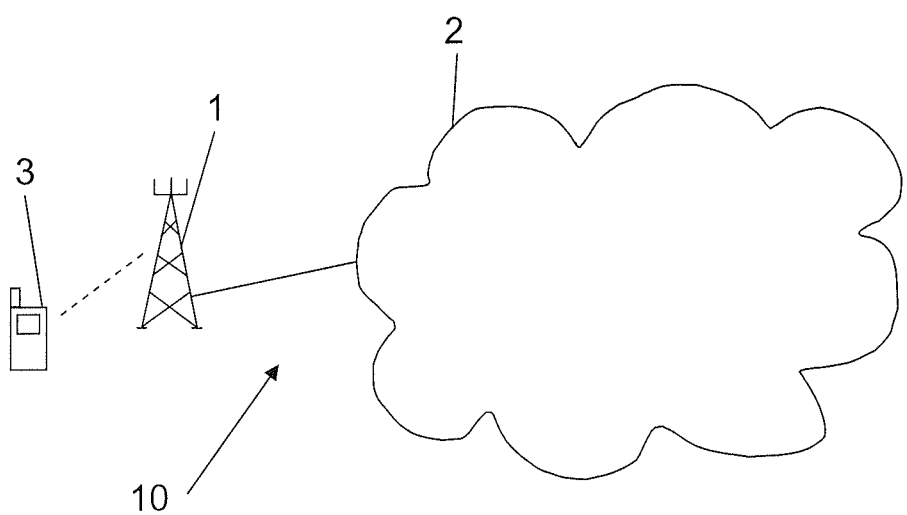
FIG. 2 illustrates schematically an embodiment of a network system according to the present invention.

FIG. 2 shows a network 10 according to the present invention. The network 10 comprises at least one base station/node device 1 or similar wireless access gateway (e.g. access point) to an infrastructure communication network 2. The base station 1 is arranged to wirelessly communicate with user equipment 3 (UE) through network connections. The base station 1 may comprise one or more antennas. When a user equipment 3 is detached, a mobile access gateway (MAG) node needs to close all public data network (PDN) connections for the user equipment 3. As described above, this was previously done by using a number of messages. However, the present invention provides one message that closes all network connections to the user equipment and thus saves signaling and bandwidth. In some cases, it is not the MAG who performs the closing of the PDN connections, but it can also be a Policy and Charging Rules Function (PCRF) node that performs the closing. The PCRF can be the unit performing the closing due to a policy and administration reason.

Figure 3:
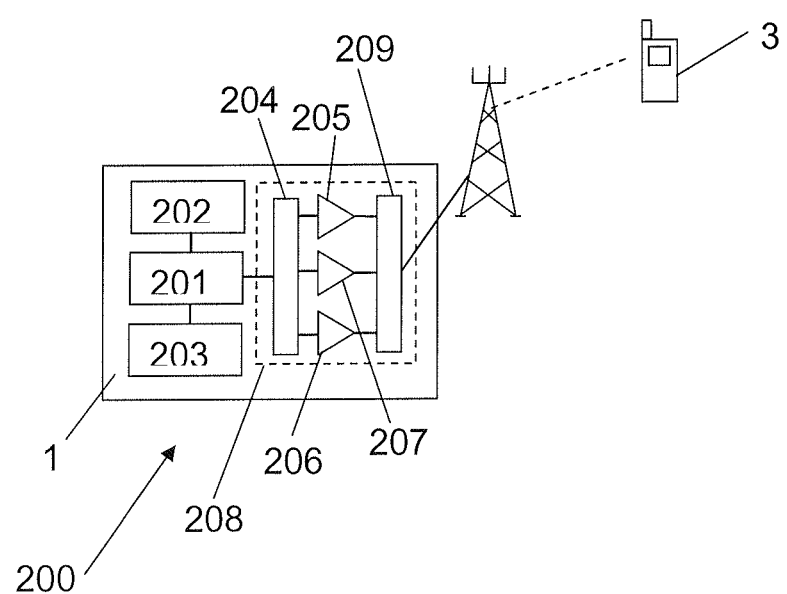
FIG. 3 illustrates schematically in a block diagram for a method according to the present invention.

In FIG. 3 a node device 1 (e.g. a base station) implementing the solution according to the present invention is shown. The node 1 may comprise at least one processing unit 201, at least one memory unit 202, and at least one communication interface 203. Furthermore, the device comprises a transceiver portion 208 for receiving and transmitting radio signals. The transceiver portion may comprise AD/DA unit(s) 204, at least one power amplifier 205, 206, 207, and optionally a switch/multiplexer 209. The processing unit 201 is arranged to run code for communication control and data traffic. It may further be arranged to determine which antennas to use in a multiple input multiple output (MIMO) communication configuration. The processing unit 201 may comprise for instance a microprocessor, a Digital Signal Processor (DSP), an ASIC (application Specific Integrated Circuit), or an FPGA (Field programmable gate array) or a combination of these. The memory unit 202 may comprise any suitable type of memory (volatile and/or non-volatile) such as e.g. RAM, ROM, EEPROM, Flash, and hard disk. The communication interface 203 connects the node 1 to the infrastructure network 2. It should be understood by the skilled person that other communication equipment may be present as well depending on the type of wireless communication protocol/standard used. It should be noted that the transceiver portion 208 may be configured in different ways depending on radio technology and/or communication protocol used as understood by the skilled person.

A new indication-Information Element (IE) can be used in the existing Delete message indicating that the message is valid for one user equipment and all its connections. This information element can be defined as a 3GPP Vendor Specific Option (VSO) Information Element and added to the appropriate messages. 3GPP Vendor Specific Mobility Options Subtypes (VSO) for PMIP is specified in TS 29.275. This new VSO is "Delete all connections for the User Equipment" which will close all connections for one user equipment 3. When the new VSO is received, it indicates that the IETF (Internet Engineering Task Force) definition of the message handling procedure in the receiver shall be overridden, and that all connections for the user equipment shall be deleted.

Figure 4:
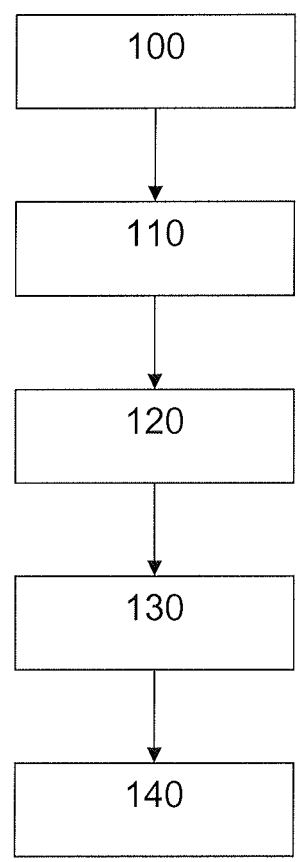
FIG. 4 illustrates in a block diagram for another method according to the present invention.

FIG. 4 illustrates schematically in a block diagram a method according to the present invention. First, a user equipment is detached 100. Then a local mobility anchor (LMA) node receives 110 a control message. The message is preferably a Proxy Binding Update (PBU) message. The PBU message comprises a number of parameters. A Mobile Node ID (MN-ID) indicates the user equipment, Home Network Prefix (HNP) together with APN indicates which public data network connection that is being used, a "TimeToLive" parameter=0 indicates that the public data network connection is supposed to be closed/deleted. The PBU message also comprises the above mentioned VSO "Delete all connections for the user equipment" which indicates that the included HNP and APN parameters may be omitted for sending side and it shall be ignored for receiving side if it is presented and that all public data network connections for the MN-ID in the LMA/PGW shall be closed/deleted. The LMA reads 120 the parameters in the received message. The next step in the method is that the LMA closes 130 the public data network connections according to the received message. After the public data network connections have been closed, the LMA sends an acknowledgement 140 to message sender indicating what operation has been performed. If all connections were closed, the acknowledgement includes the "Delete all connections for the user equipment"—VSO. However, if some of the public data network connections were not closed as a result of the "Delete all connections for the user equipment"—VSO, the acknowledgement includes a VSO containing a list of the Packet Data Networks (PDNs) that were not closed. When the VSO with the list of connections not closed is sent, a troubleshooting function is triggered.

Figure 5:
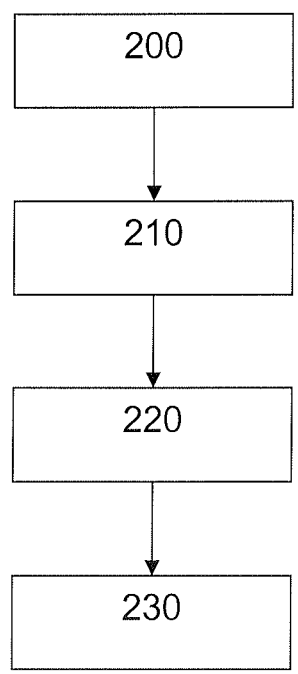
FIG. 5 illustrates the basic components used in the present invention.
Figure 6:
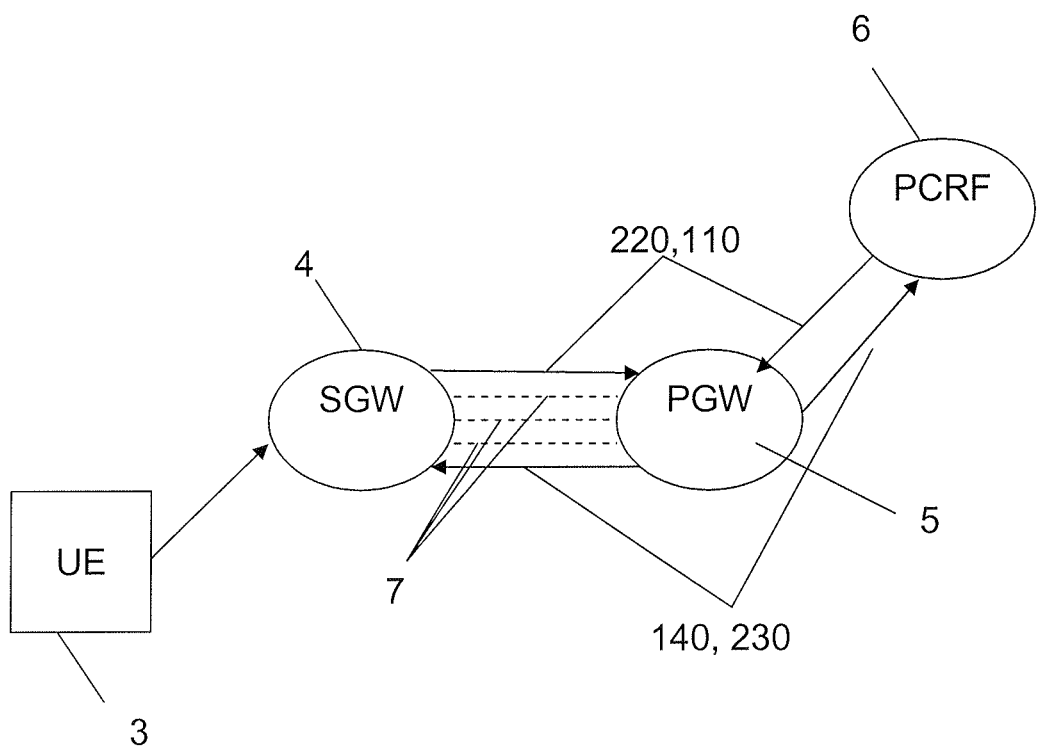
FIG. 6 illustrates a schematic overview of a system implementing embodiments of the present invention.

Another method according to the invention is illustrated in FIG. 5. A detached user equipment is detected 200. This indicates that all network connections need to be closed, and a decision close 210 is taken. A message comprising instructions to close the all the network connections is then sent 220. After the connections have been closed, an acknowledgement is received 230. As mentioned above, the acknowledgement includes the "Delete all connections for the user equipment"—VSO. If some of the public data network connections were not closed as a result of the "Delete all connections for the user equipment"—VSO, the acknowledgement includes a VSO containing a list of the PDNs that were not closed. When the VSO with the list of connections not closed is sent, a troubleshooting function is triggered. The unit detecting the detached user equipment, taking the decision, sending the control message and receiving the acknowledgement can either be the MAG or a Policy and Charging Rules Function (PCRF). An overview of this is shown in FIG. 6.

Summarized, the basic concept of the present invention is that in the in case the MAG/PCRF needs to close all public data network connections for a user equipment, e.g. due to detach of the user equipment, it can be user equipment initiated or Home Subscriber Server (HSS) initiated. It is necessary to close all network connections for policy and administration reasons, in situations where radio connection lost, etc. It is possible to close all connections by send a new indication-Information Element in the existing Delete message indicating that the message is valid for one user equipment and all its connections. This information element can be defined as a 3GPP Vendor Specific Option (VSO) information element and added to the appropriate messages. When the new VSO is received, it indicates that the IETF definition of the message handling procedure in the receiver shall be overridden, and that all connections for the user equipment shall be deleted. Thus, the closing of all network connections is done using only one PBU/PBA exchange and thereby saving signaling in the Core Network.

Although the invention has been described in detail for the purpose of illustration, it is to be understood that such detail is solely for that purpose and that variations can be made therein by those skilled in the art without departing from the spirit and scope of the invention except as it may be limited by the claims.

REFERENCE NUMERALS

1. Base station/node device
2. Communication network
3. User equipment
4. MAG
5. LMA
6. PCRF
7. Network connections
8. Eutran
9. HSS
10. PCRF
11. Non-3GPP Access
12. Operator's IP Services
13. MME
14. SGW
15. PGW
100. Detach user equipment
110. Receive message
120. Read message
130. Close connections
140. Send acknowledgement
200. Detecting detached user equipment
201. Processing unit
202. Memory unit
203. Communication interface
204. AD/DA unit
205-207. Power amplifier
208. Transceiver
209. Switch/multiplexer
210. Deciding to close
220. Sending message
230. Receiving acknowledgement

ABBREVIATIONS

APN Access Point Name
ASIC Application Specific Integrated Circuit
BRI Binding Revocation Indication
BRA Binding Revocation Ack
CN Cellular Network
DSP Digital Signal Processor
EPC Evolved packet Core
FPGA Field Programmable Gate Array
GPRS General Packet Radio Service
HNP Home Network Prefix
HSS Home Subscriber Server
IE Information Element
LTE Long Term Evolution
LMA Local Mobility Anchor
MAG Mobile Access Gateway
MIMO Multiple Input Multiple Output
MN-ID Mobile Node ID
PCRF Policy and Charging Rules Function
PDN Packet Data Network
PMIP Proxy Mobile IP
PBU Proxy Binding Update
PBA Proxy Binding Acknowledgement
PGW Packet Data Network Gateway
SAE System Architecture Evolution
SGW Serving Gateway
UE User Equipment
VSO Vendor Specific Option

The invention claimed is:

1. A method for closing multiple mobility protocol network connections to at least one user equipment using one message exchange, comprising the following steps:

receiving, from a mobile access gateway (MAG), when the at least one user equipment is detached, a control message in a local mobility anchor (LMA) node, the control message comprising instructions to close the multiple network connections;

reading the control message in the LMA node;

closing the multiple network connections to the user equipment;

sending an acknowledgement to an the MAG; and wherein the control message comprises an information element indicating that the message is valid for the at least one user equipment and all its network connections, wherein the information element is a 3GPP vendor specific option (VSO), information element.

2. The method according to claim 1, wherein the VSO comprises an instruction to delete all connections for the user equipment.

3. The method according to claim 1, wherein the control message is a proxy binding update (PBU).

4. The method according to claim 1, wherein the acknowledgement is a proxy binding acknowledgement (PBA), comprising one of:
    a verification that all network connections are closed or a list of network connections that are not closed.

5. A method in a mobile access gateway (MAG), for closing multiple mobility protocol network connections to at least one user equipment using one message exchange, the method comprising the following steps:
    detecting a detached user equipment;
    deciding to close the at least one user equipment's network connections;
    sending a control message to a local mobility anchor (LMA), when the at least one user equipment is detached, the control message comprising instructions to close the multiple network connections;
    receiving an acknowledgement from the LMA;
    wherein the acknowledgement is a proxy binding acknowledgement (PBA), comprising one of the following:
        a verification that all network connections are closed or a list of network connections that are not closed.

6. The method according to claim 5, wherein the list of network connections that are not closed triggers a troubleshooting function.

7. A communication node in a telecommunications network arranged to close multiple mobility protocol network connections associated with at least one user equipment when the at least one user equipment is detached using one message exchange, said node comprising:
    a memory; and
    a processor arranged to execute instruction sets stored in the memory, wherein the processor is arranged to:
        receive a control message through a communication interface when the at least one user equipment is detached;
        read the control message;
        close the multiple network connections to the at least one user equipment; and
        send an acknowledgement to the telecommunications network through the communications interface
        wherein the control message comprises an information element indicating that the message is valid for one user equipment and all its network connections, wherein the information element is a 3GPP vendor specific option (VSO) information element.

8. A system comprising:
    a first node; and
    a second node;
    wherein the first node is arranged to be connected to the second node via multiple mobility protocol network connections, the first node comprising a mobile access gateway (MAG) and the second node comprising a local mobility anchor (LMA);
    wherein the first node is further arranged to send a control message to the second node, when the at least one user equipment is detached, the control message comprising instructions to close the multiple network connections; and
    wherein the second node is arranged to:
        receive and read the control message;
        to close the multiple network connections; and
        to send an acknowledgement to the first node;
        wherein the control message comprises an information element indicating that the message is valid for one user equipment and all its network connections, wherein the information element is a 3GPP vendor specific option (VSO), information element.

* * * * *

UNITED STATES PATENT AND TRADEMARK OFFICE
CERTIFICATE OF CORRECTION

PATENT NO. : 8,958,787 B2
APPLICATION NO. : 13/140963
DATED : February 17, 2015
INVENTOR(S) : Rydnell et al.

Page 1 of 1

It is certified that error appears in the above-identified patent and that said Letters Patent is hereby corrected as shown below:

On the Title Page, in Item (12), under "United States Patent", in Column 1, Line 1, delete "Rydneil" and insert -- Rydnell --, therefor.

On the Title Page, in Item (75), under "Inventors", in Column 1, Line 1, delete "Rydneil," and insert -- Rydnell, --, therefor.

IN THE SPECIFICATION

In Column 1, Line 31, delete "(PGW) 13" and insert -- (PGW) 15 --, therefor.

In Column 1, Line 33, delete "PGW 13" and insert -- PGW 15 --, therefor.

In Column 1, Line 40, delete "(SGW) 12" and insert -- (SGW) 14 --, therefor.

In Column 1, Line 41, delete "PGW 13" and insert -- PGW 15 --, therefor.

In Column 2, Line 37, delete "or a" and insert -- for a --, therefor.

In Column 3, Line 52, delete "system." and insert -- system; --, therefor.

In Column 3, Line 58, delete "invention." and insert -- invention; --, therefor.

In Column 3, Line 60, delete "invention." and insert -- invention; --, therefor.

IN THE CLAIMS

In Column 7, Line 9, in Claim 1, delete "an the" and insert -- the --, therefor.

In Column 8, Line 15, in Claim 7, delete "interface" and insert -- interface; --, therefor.

Signed and Sealed this
Twenty-seventh Day of October, 2015

Michelle K. Lee
*Director of the United States Patent and Trademark Office*